(12) United States Patent
Riza et al.

(10) Patent No.: US 8,213,022 B1
(45) Date of Patent: Jul. 3, 2012

(54) SPATIALLY SMART OPTICAL SENSING AND SCANNING

(75) Inventors: Nabeel A. Riza, Oviedo, FL (US); Frank Perez, Tujunga, CA (US)

(73) Assignees: University of Central Florida Research Foundation, Inc., Orlando, FL (US); Nusensors, Inc., Oviedo, FL (US)

( * ) Notice: Subject to any disclaimer, the term of this patent is extended or adjusted under 35 U.S.C. 154(b) by 302 days.

(21) Appl. No.: 12/717,459

(22) Filed: Mar. 4, 2010

Related U.S. Application Data (60) Provisional application No. 61/157,448, filed on Mar. 4, 2009, provisional application No. 61/169,501, filed on Apr. 15, 2009.

(51) Int. Cl.
*G01B 11/30* (2006.01)

(52) U.S. Cl. ....... 356/609; 356/5.01; 356/602; 356/495; 359/290; 382/255

(58) Field of Classification Search .......... 356/609, 356/124, 495, 33, 127; 382/255; 348/202, 348/203
See application file for complete search history.

(56) References Cited

U.S. PATENT DOCUMENTS

| | | | |
|---|---|---|---|
| 3,902,803 A | 9/1975 | Lego | |
| 4,105,332 A | 8/1978 | Hohne et al. | |
| 5,764,360 A | 6/1998 | Meier | |
| 6,687,036 B2 | 2/2004 | Riza | |
| 6,753,950 B2 | 6/2004 | Morcom | |
| 6,829,043 B2 | 12/2004 | Lewis | |
| 6,833,909 B2 | 12/2004 | Schmidt et al. | |
| 6,876,441 B2 | 4/2005 | Barker | |
| 6,917,415 B2 | 7/2005 | Gogolla et al. | |
| 7,072,086 B2 * | 7/2006 | Batchko | 359/15 |
| 7,079,324 B2 * | 7/2006 | Yamasaki | 359/680 |
| 7,221,435 B2 | 5/2007 | Stierle et al. | |
| 7,233,279 B2 | 6/2007 | Moriya et al. | |
| 7,315,355 B2 | 1/2008 | Sperber | |
| 7,324,218 B2 | 1/2008 | Stierle et al. | |
| 7,359,039 B2 | 4/2008 | Kloza | |
| 7,388,810 B2 | 6/2008 | Campbell | |
| 7,564,632 B2 * | 7/2009 | Kuo | 359/683 |
| 8,107,056 B1 * | 1/2012 | Riza | 356/4.05 |

* cited by examiner

*Primary Examiner* — Tarifur Chowdhury
*Assistant Examiner* — Isiaka Akanbi
(74) *Attorney, Agent, or Firm* — Brian S. Steinberger; Phyllis K. Wood; Law Offices of Brian S. Steinberger, P.A.

(57) ABSTRACT

Methods, devices and systems of an optical sensor for spatially smart 3-D object measurements using variable focal length lenses to target both specular and diffuse objects by matching transverse dimensions of the sampling optical beam to the transverse size of the flat target for given axial target distance for instantaneous spatial mapping of flat target, zone. The sensor allows volumetric data compressed remote sensing of object transverse dimensions including cross-sectional size, motion transverse displacement, inter-objects transverse gap distance, 3-D animation data acquisition, laser-based 3-D machining, and 3-D inspection and testing. An embodiment provides a 2-D optical display using 2-D laser scanning and 3-D beamforming optics engaged with sensor optics to measure distance of display screen from the laser source and scanning optics by adjusting its focus to produce the smallest focused beam spot on the display screen. With known screen distance, the angular scan range for the scan mirrors can be computed to generate the number of scanned spots in the 2-D display.

22 Claims, 9 Drawing Sheets

SPATIALLY SMART OPTICAL SENSING AND SCANNING

This application claims the benefit of priority to U.S. Provisional Application Nos. 61/157,448 filed on Mar. 4, 2009 and 61/169,501 filed on Apr. 15, 2009.

FIELD OF THE INVENTION

This invention relates to optical sensors and, in particular, to methods and devices and systems of optical sensor designs for spatially smart three dimensional object measurements using hybrid digital-analog controlled variable focal length lenses to target specular and diffuse objects and laser scanning displays where a laser beam is scanned in 2-D space by scanning optics so the human eye on temporal integration in-directly sees a 2-D image on the projection screen or directly on the human retina.

BACKGROUND AND PRIOR ART

Three-dimensional (3-D) object sensing is required in a variety of industrial and scientific applications such as thermal sensing, animation, laser machining, parts inspection, virtual reality, building scanning, and architecture and model construction. Target 3-D information is generally acquired by scanning a laser beam in transverse dimensions of a target to acquire the target transverse and axial (in light direction) dimensions data. As described in the prior art, much effort is spent to extract the target axial direction data such as via optical triangulation methods.

More commonly, time of flight laser radar methods using time/frequency RF modulation of the laser beam have also been used for 3-D object distance measurements. Object transverse dimensions data is simply acquired by scanning the laser beam across the lateral dimensions of the target on a point-by-point basis with a fixed transverse scan point count, e.g., 500×500 points for all the different axial planes of the object determined by other distance sensing methods such as laser radar or triangulation. For example, triangulation has also been used to measure object lateral displacement.

Other prior art works in distance measurement sensors include various methods such as absolute distance measurement with heterodyne optical feedback on a Yb:Er glass laser; absolute Distance Measurement with an Optical Feedback Interferometer; absolute distance measurement by dispersive interferometry using a femtosecond pulse laser; long distance measurement with high spatial resolution by optical frequency domain reflectometry using a frequency shifted feedback fiber laser; distance measurement with extended range using lateral shearing interferometry and Fourier transform fringe analysis; $2\pi$ ambiguity-free optical distance measurement with subnanometer precision with a novel phase-crossing low-coherence interferometer; high-accuracy absolute distance measurement using frequency comb referenced multiwavelength source; absolute distance measurement by lateral shearing interferometry of point-diffracted spherical waves; adaptive whole-field optical profilometry: a study of the systematic errors; PIN-diode based optical distance measurement sensor for low optical power active illumination; and distance measurement system with a planar light wave circuit.

Known U.S. patents include U.S. Pat. No. 6,753,950 issued to John Morcom, entitled "Optical Distance Measurement"; U.S. Pat. No. 6,829,043 issued to R. Lewis, C. Thomson, titled "Distance measurement device with short distance optics"; L. A. Campbell, Ultrasonic distance measurement system, U.S. Pat. No. 7,388,810 issued Jun. 17, 2008; M. Kloza, Device for precise distance measurement, U.S. Pat. No. 7,359,039 issued Apr. 15, 2008 which describes an RF delay method.

Other U.S. patents include U.S. Pat. No. 7,324,218 issued Jan. 29, 2008 to J. Stierle, P. Wolf, G. Flinspach titled "Method and device for distance measurement", which describes an optical method; U.S. Pat. No. 7,315,355 issued Jan. 1, 2008 to P. Sperber tided "Method and device for optical distance measurement"; M. Moriya, S. Ishii; U.S. Pat. No. 7,233,279 issued Jun. 19, 2007 to Satoshi, T. Seld, K. Hamada, K. Oka, A. Ohta, titled "Method and device for distance measurement by pulse radar" which describes RF Radar; U.S. Pat. No. 7,221,435 issued May 22, 2007 to J. Stierle, P. Wolf, K. Renz, titled "Device and method for optical distance measurement"; T. Gogolla, A. Winter, H. Seifert, Method of and apparatus for electro-optical distance measurement, U.S. Pat. No. 6,917,415, Jul. 12, 2005; A. J. Barker, Optical sensor for distance measurement, U.S. Pat. No. 6,876,441, Apr. 5, 2005; D. Schmidt; J. Stierle, P. Wolf, G. Flinspach, Device for optical distance measurement of distance over a large measuring range.

Other U.S. patents include U.S. Pat. No. 6,833,909, Dec. 21, 2004; W. Holm; R. H. Hines, Apparatus for producing a light beam having a uniform phase front and distance measuring apparatus, U.S. Pat. No. 4,105,332, Aug. 8, 1978; L. J. Lego, Jr., High pulse repetition frequency electro-optical viewing system, U.S. patent No. issued on Sep. 2, 1975; D. C. Shafer, A. G. Butler; W. R. Burnett, Level with angle and distance measurement apparatus, U.S. Pat. No. 6,741,343 issued on May 25, 2004.

Publications and patents authored by or issued to Nabeel A. Riza, a co-inventor of the subject application include N. A. Riza, "Multiplexed Optical Scanner Technology," U.S. Pat. No. 6,687,036, Feb. 3, 2004; N. A. Riza and A. Bokhari, "Agile Optical Confocal Microscopy Instrument Architectures For High Flexibility Imaging," in Three Dimensional Confocal Microscopies, BIOS 2004 Biomedical Optics, Photonics West, Proc. SPIE Vol. 5324, Paper No. 14, pp. 77-88, San Jose, Calif., January 2004; S. A. Khan and N. A. Riza, "Demonstration of a No-Moving-Parts Axial Scanning Confocal Microscope thing Liquid Crystal Optics," Opt. Comm., Vol. 265, pp. 461-467, 2006; M. Sheikh and N. A. Riza, "Blood Vessel 3-D Imaging Using Electronically Controlled Optics Lens-Based Confocal Microscopy," OSA Top. Mtg on Biomedical Optics, Technical Digest, paper no. BTuF64, March 2008; N. A. Riza, M. Sheikh, G. Webb-Wood, and P. G. Kik, "Demonstration of three-dimensional optical imaging using a confocal microscope based on a liquid-crystal electronic lens," Optical Engineering Journal, Vol. 47, No. 6, pp. 063201-1 to 063201-9, June 2008.

Ideally, one would like to have a relative distance sensor that non-invasively acquires 3-D object reconstruction data from an illuminated target with minimal object (or laser beam) scanning and minimal volumetric data generation. Recently, N. A. Riza, a co-inventor of the subject application filed a related U.S. Provisional Application No. 61/097,589, filed on Sep. 17, 2008 titled "Hybrid Design High Dynamic Range High Resolution Optical Distance Sensor" and N. A. Riza and authored an article S. A. Reza, "Non-Contact Distance Sensor using Spatial Signal Processing," Optics Letters, Vol. 34, No. 4, pp. 434-436, Feb. 15, 2009 which proposed and demonstrated an optical distance sensor using direct spatial processing (basic version does not use time/frequency modulation of the light) that has a wide distance dynamic range, excellent on-axis distance measurement resolution, and high optimal spatial profiling resolution (i.e., transverse to optical beam propagation axis) at all axial distances of the 3-D scan operation.

The methods and devices of the present invention further expands on the proposed spatial processing distance sensor such that, it forms a spatially smart, optical sensor to engage a variety of spatial dimensions 3-D targets, such as needed for temperature sensing via an array of different size Silicon Carbide optical chips or a 3-D target with different size transverse structural zones at different axial depths.

Compared to prior-art optical distance measurement 3-D sensors where the scanning beam spot size stays fixed (apart from the natural beam diffraction-based expansion) for all 3-D scarf positions of the beam on the 3-D target (what is called non-smart spatial sampling), the optical sensor of the present invention adjusts the transverse beam spot size at each axial position based on the specific target's 3-D shape profile.

A problem with all prior-art laser scanning projection displays is that the farther the distance of the screen from the laser scan optics, the poorer the spatial resolution of the image due to the natural diffraction-based spreading of the Gaussian laser beam that forms the individual pixel/spot in the pixelated display.

What is needed to solve these problems is a laser scanning projection display that does not have a drastic reduction in display spatial resolution as the distance of display screen from laser optics increases. In addition, for any given screen distance, one would like to produce a display with an increased pixel count without sacrificing the pixel size. Proposed in this application is such a smart optical display that does away with the limitations associated with the classic laser scanning display approach.

SUMMARY OF THE INVENTION

A primary objective of the invention is to provide methods and devices and systems for a smart spatial sampling optical sensor for 3-D targets that matches the transverse optical beam size to the target transverse size at the given axial (along optical axis) location.

Another objective of the invention is to provide methods and devices and systems of optical sensor designs for spatially smart three dimensional (3-D) object measurements using hybrid digital-analog controlled variable focal length lenses to target both optically specular (i.e., reflective) and diffused/scattering objects.

Another objective of the invention is to provide devices, methods and optical sensor designs wherein spatial smartness is produced by matching the transverse dimensions of the sampling optical beam to the transverse size of the flat target zone for a given axial (along light travel direction) target distance. In effect, instantaneous spatial mapping of the flat target zone, like an optical chip for thermal sensing, is implemented without the need for point-by-point smallest resolution transverse beam scanning over the flat zone.

Thus, compared to prior-art optical distance measurement 3-D sensors where the scanning beam spot size stays fixed (apart from the natural beam diffraction-based expansion) for all 3-D scan positions of the beam on the 3-D target (what is called non-smart spatial sampling), the sensor of the present invention adjusts the transverse beam spot size at each axial position based on the specific target's 3-D shape profile. Thus, a smart or optimized smaller sampling data set is generated for a given target.

Depending on the target optical surface quality (diffused or specular), the targeted beam spot on the object is monitored by an off-axis optical camera or on-axis photo-detector optics and electronics. Thus, the spot detection optics and electronics provides feedback to the variable lens controllers to produce the minimal scanned spot beam to gather 3-D object shape reconstruction data. Hence, the proposed agile focal length novel sensor designs allows volumetric data compressed remote sensing of 3-D object transverse dimensions data.

Furthermore, and most importantly, the proposed sensor uses a spot beam on the target to match the object transverse size at the given target depth, this in-turn allows the sensor to measure parameters such as object cross-sectional size, object motion transverse displacement, and inter-objects transverse gap distance. The transverse direction object size or object boundary measurement method at any given axial distance position in the 3-D target is a powerful feature of the proposed smart sampling optical sensor.

This smart spatial sampling method not only applies to sampling of 3-D targets, but also works for Two Dimensional (2-D) (e.g., optical film, planar chip substrate/wafer, cloth, plastic sheet, and one-dimensional (1-D) (e.g., tape, 1-D bar codes) targets. The proposed reduced scan spots systems can be used for 3-D computer animation and gaming data acquisition, real-time motion capture of human motion, laser-based 3-D machining, & 3-D object inspection and testing. The photo-detection optics used can be CCD cameras or single or multi-quadrant photo-detectors.

Time and frequency modulation techniques common to many distance sensors can be incorporated into the proposed agile focal length smart sampling sensors to produce all-powerful distance and object sampling measurement features. The preferred sampling beam source proposed in this application is a laser, although other directional sources such as microwave/millimeter/TeraHertz wave radiation or ultrasonic waves is also a deployable source.

Multiple lasers at different wavelengths (e.g., red, green, blue) can also be used as a single collinear electrically controlled light beam source, such as for color 3-D object mapping.

The previously described distance sensor optics using laser scan optics can form a smart laser writing system for 2-D surfaces such as when laser machining 3-D objects or when laser scanning 3-D objects for 3-D object reconstruction. In this embodiment, the same concept is extended to realize a smart 2-D display that simultaneously engages both the distance sensor capability and the smart high resolution beam 2-D scanning capability of the smart scanning distance sensor optics. Hence, this embodiment of the present invention introduces the design of this new smart display application using the previously described scanning distance sensor. Specifically, a full color display is presented that uses red, green, and blue lasers in combination with, one 2-D scan mirror optics and one 3-D beamformer optic like a programmable analog-digital variable focus lens system. n the very, basic design case, the 3-D beamformer optic is a fluidic or liquid lens such as from Varioptic, France.

First the system acts as a distance sensor using one laser beam observed on the screen using viewing optics such as a camera or human eye viewing (depends on screen distance from laser).

Once the distance of screen from laser is computed, the programmable lens focal length is now optimized such that the smallest spot beam for all three primary colors (red, green, blue) is seen on the display screen. During display calibration process for different screen distances, the programmable lens focal lengths and mirror scan angles are recorded for generating the required P×Q pixels display. In addition, larger size and pixel count displays will now be possible given for any distance, the spatial spot size will be the smallest given a screen distance. The electronic lens can also be programmed to produce a larger spot size than normally possible by using the diverging lens aspect of the 3-D beamforming optic if a very large display size is needed for a given distance that otherwise would not be possible using beam's natural diffraction and would require many more pixels to fill the display.

Further objects and advantages of this invention will be apparent from the following detailed description of preferred embodiments which are illustrated schematically in the accompanying drawings.

DESCRIPTION OF THE DRAWINGS

FIGS. 2b, 2c and 2d show beam spots of the sensor of FIG. 2a.

DETAILED DESCRIPTION OF THE INVENTION

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1A:
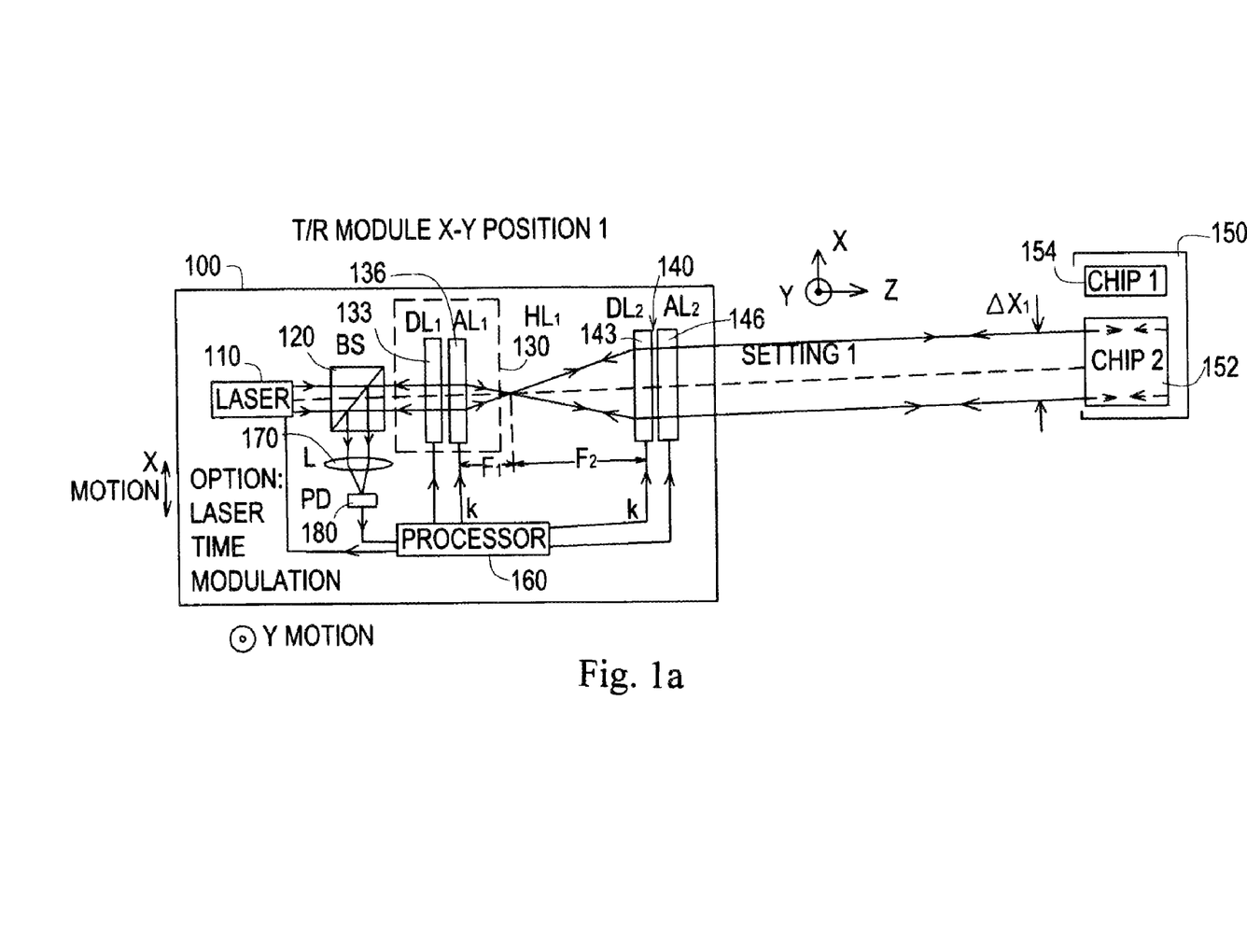
FIGS. 1a and 1b are schematic block diagrams showing an embodiment of the smart spatial measurement sensor for 3-D reflective targets.
Figure 1B:
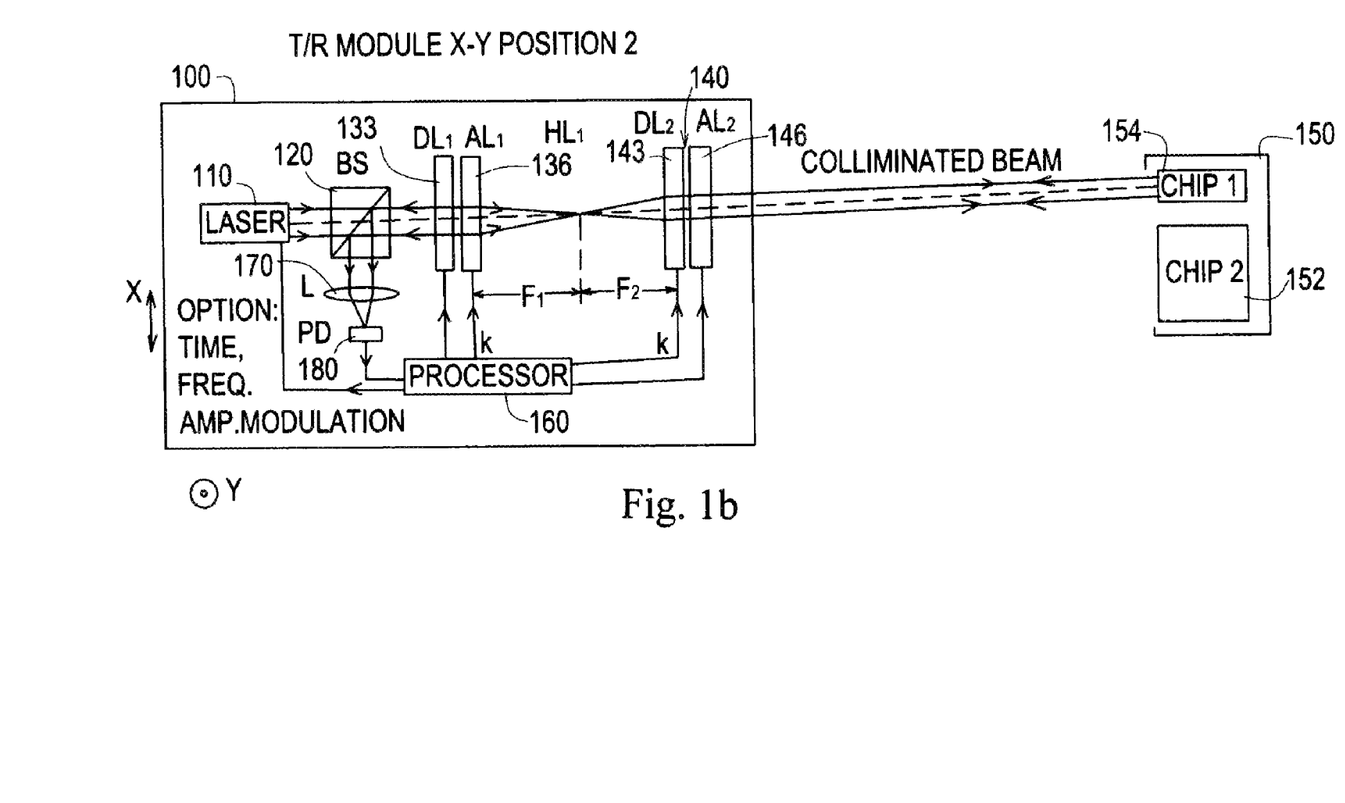

FIGS. 1a and 1b are schematic block diagrams showing the smart spatial measurement sensor for 3-D reflective targets according to an embodiment f the present invention. In FIG. 1a, the module 100 is shown in a first x-y position 1 directed toward chip 152 of chip array 150. A collimated laser beam from a laser 110 passes through a Beam Splitter 120 and the Hybrid Lenses 130 and 140 directed towards a target array 150, two separate targets are shown as two chips, Chip 152 and Chip 154 with different chip lateral sizes, subjected to a transverse—in plane normal to optical axis distance measurement. In the example shown, the target is a distributed array of thermally sensitive optical 3-D chips.

Each hybrid lens 130 and 140 is made up of a variable focal length digital lens 133 and 143 and cascaded variable focal length analog lens 136 and 146, respectively, to form a high dynamic range and high resolution variable focal length telescopic targeting optical system. Hybrid lens 130 is controlled via digital step variable focus lens 133 and analog step variable focus lens 136 produces a F1 effective focal length while the second hybrid lens 140 controlled via digital lens 143 and analog lens 146 produces a F2 effective focal length. Each digital lens 133 and 143 is controlled by a control signal labeled as k from the processing device 160 that varies from k=1, 2, 3, . . . , to K, producing K different focal lengths.

The focal length resolution of the variable digital lens 133 is designed to be equal to the analog lens 136 variable focus range of "1" where 1=nΔ1 with n=1, 2, 3, . . . , N. Thus the analog lens 136 has N different focus positions. In total the hybrid lens 130 produces K times N variable focal length positions implying K×N independent transverse boundary positions that can be measured by the sensor. In effect, both a high dynamic range and high resolution transverse distance measurement is possible as the digital lenses 133 and 143 gives the transverse distance measurement dynamic range while the analog lenses 136 and 146 gives the transverse distance measurement fine resolution. The fixed distance between hybrid lens 130 and hybrid lens 140 is F1+F2. Given that F1 and F2 can be varied by controlling the analog lens 136/146 and digital lens 133/143 pairs, the magnification F2/F1 of the telescope can be changed such that the targeting beam size is made to match the target 152/154 lateral dimension.

In FIG. 1b, the module 100 is shown in a first x-y position 2 directed toward chip 154 of chip array 150. In FIG. 1a, the beam size matched for chip 152 lateral size while the in FIG. 1b the laser beam size is matched for the smaller chip 154 lateral size. In effect, smart sampling: of the 3-D targets 150 is achieved that produces the optimal sensing power. For example, the optical chips can be Silicon Carbide optical chips being used as remote temperature sensors. As the electrical drive conditions for the digital lens 133/143 and analog lens 136/146 are varied to illuminate the entire lateral size of the target, one then knows the beam size that completely fills the target; thus the target lateral size can be measured.

Because the targets shown in FIGS. 1a and 1b are reflective, the incident collimated laser beam returns to the optical Transmit/Receive (T/R) module 100 so it can be measured by a Photo-detector (PD) 180. A spherical focus lens 170 produces focused spot on the for example single element photo detector 180. When sweeping the digital lens and analog lens focal lengths F1 and F2, the optical power at the photo detector 180 takes a drop when the optical beam over-floods the target. Hence, one can monitor the photo detector 180 power to determine when the beam spot on the target 152/154 matches the target lateral size. Given F1 and F2 would be known for this optimal hybrid lens 130 and hybrid lens 140 setting, one can compute the beam size on the target and hence the target lateral size. F1 and F2 can be adjusted to match the beam size to the chip size & and can be changed to produce a smaller spatial beam for the sensor chip sampling.

The T/R module 100 sits on a x-y motion stage that allows the targeting beam to scan a different x-y position zone of the 3-D target. As such, smart sampling of an in-plane, target is possible, i.e., chip 154 and Chip 152 have the same axial, or z-direction locations.

One skilled in the art should realize that the particularities in the optical sensor system should not be construed as limitation of the preferred embodiment. Various system configurations and corresponding components may be chosen and optimized for a particular application to achieve a desired performance and other methods to determine target axial position/distance, such as time of flight or laser radar methods can be substituted.

Figure 2A:
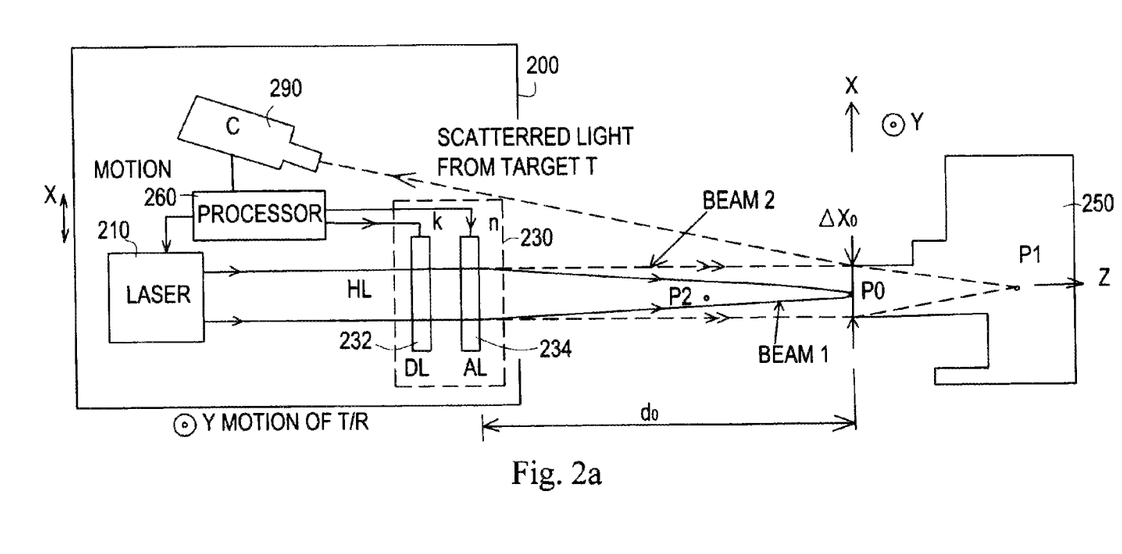
FIG. 2a is a schematic block diagram showing another embodiment of the smart spatial measurement sensor for 3-D scattering targets.

FIG. 2a shows a top view of an alternative embodiment of the smart spatial sampling system that is applied to diffused or optically scattering targets. In this example, the target is a fixed three-dimensional target structure that scatters (diffuses) light. This alternative system also measures the target 250 axial position distance such as described in co-pending U.S. Provisional application No. 61/097,589 filed on Sep. 17, 2008 titled "Hybrid Design High Dynamic Range High Resolution Optical Distance Sensor" having a common inventor N. A. Riza which is also described in N. A. Riza and S. A. Reza, "Non-Contact Distance Sensor using Spatial Signal Processing," Optics Letters, Vol. 34, No. 4, pp. 434-436, Feb. 15, 2009, which are incorporated by reference.

The digital lens 232 and analog lens 234 have variable focal lengths and are controlled by control signal k and n from the processor 260. For axial distance measurement, the digital lens 232 and analog lens 234 focal lengths are adjusted so that the laser beam from laser 210 forms a minimum beam waist or smallest focused beam spot on the target 250 located at an unknown distance. One knows when the target 250 is illuminated by a focused beam by monitoring the laser beam spot on the scattering target that is observed by a Camera 290. A high resolution camera 290 and electronic image processing techniques are used estimate the beam spot size to determine when the size is a minimum.

As the hybrid lens 234 focal length is changed, the spot swings from a larger spot to a smaller spot to a larger spot. The goal of the axial distance sensor is to find the hybrid lens 234 drive conditions k and n when the spot on the optical camera 290 forms a minimum size. In other words, when the target is illuminated with a focused beam spot on the target surface, knowing k and n drive conditions allows the target axial distance $d_o$ to be computed. Similarly to the configuration shown in FIGS. 1a and 1b, the T/R module 200 sits on a x-y motion stage that allows the targeting beam to scan a different x-y position zone of the 3-D target. As such, smart sampling of an in-plane target is possible.

Figure 2B:
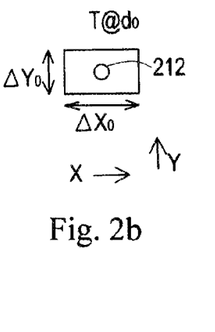
Figure 2C:
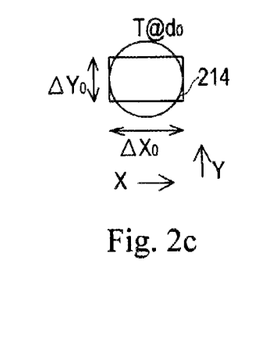
Figure 2D:
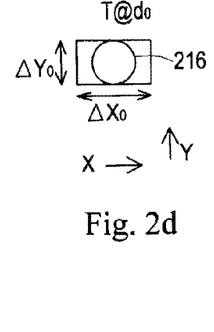

The key feature of the configuration shown in FIG. 2a sensor is that for each unique target axial position, the sensor can also measure the target lateral size. FIGS. 2b, 2c and 2d show target surface size processing at $d_o$ position of the z-axis. In FIG. 2b, the beam 212 produced by controlling the digital lens and analog lens is tightly focused to measure $d_o$. FIG. 2c shows an expanded beam spot 214 whose diameter is equal to $\Delta x_o$, the target surface dimension size. Similar to FIG. 2c, FIG. 2d shows an expanded beam spot 216 whose diameter is equal to $\Delta y_o$, the target surface y-dimension size.

As shown in FIGS. 2b, 2c and 2d, the sensor is aligned in x-y directions so it can x-y profile the $P_o$ location of the target flat zone at the $d_o$ axial distance. In order to achieve this size measurement, the hybrid lens 234 focal lengths are swept from its smallest focus spot position such that the beam spot illuminating the target zone matches the x-direction target lateral size $\Delta x_0$ and in another setting matches the y-direction target lateral size $\Delta y_0$.

As the targeting beam is symmetric, x and y-dimension sizing requires two target illuminations. Note that two different focal length positions P1 and P2 satisfy the condition of beam spot matching the target size, i.e., one with a converging beam (dashed line going to virtual point P1 in FIG. 2) on the target and another with a diverging beam (virtual ray not shown focusing at P2 in FIG. 2) on the target. In the example shown in FIG. 2, the configuration is directed toward a 3-D target shown with different flat scattering planes at different axial distances.

To map this 3-D profile, the transmit/receive module 200 is translated in x-y to center the laser beam on the different target axial planes. The first step of the sensor is to measure the axial target plane distance using the smallest spot on the target. Next, the hybrid lens 230 focal length is swept to entirely flood the target lateral zone with a beam that fills the target lateral x-dimension and then y-dimension as shown in FIGS. 2b, 2c and 2d. This way the target lateral size for this given target axial distance is measured.

These steps are repeated till the entire 3-D target profile is mapped by the sensor. For optimal alignment, the transmit/receive module 200 can also have tip-tilt motion controls. The computer processor controls the entire sensor operations. Note that the targeting laser beam can also be scanned using fast tilting mirrors to do rapid smart spatial sampling of the 3-D target.

Figure 3:
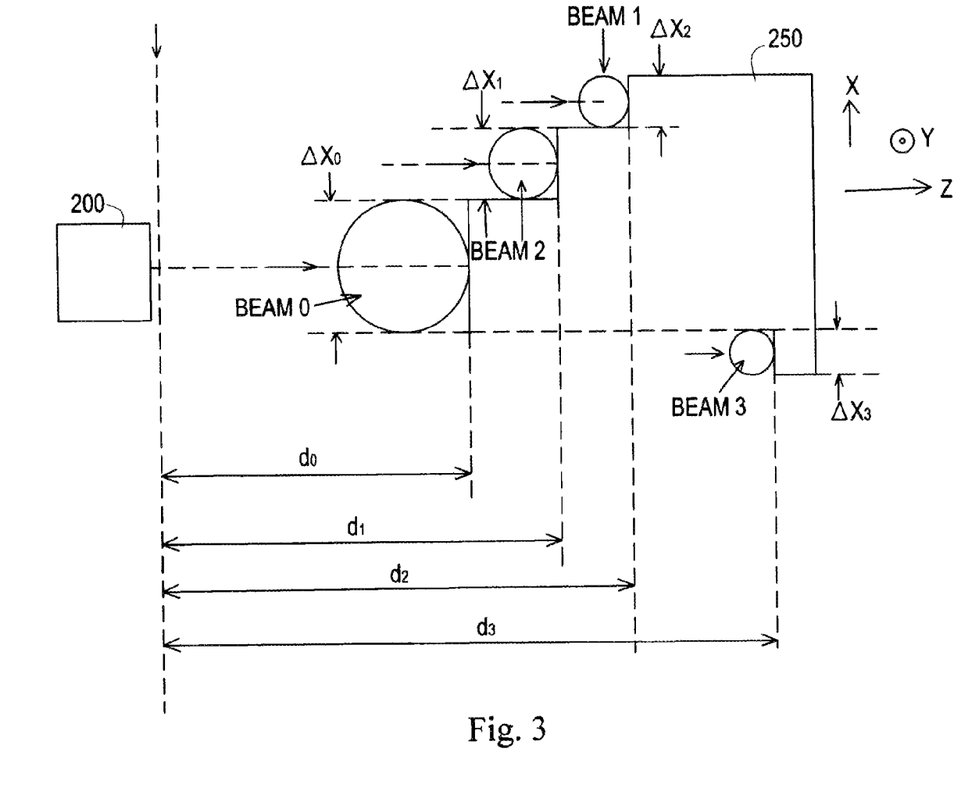
FIG. 3 is a top view of the smart spatial sampling where targeting beam spot size matches desired or unknown (but fixed) target location.

FIG. 3 shows a detailed view of the proposed smart spatial sampling process for a 3-D target. In this example, four independent target structure axial planes of are shown. Specifically, for target axial positions of $d_0$, $d_1$, $d_2$, $d_3$, the target lateral x-direction sizes given by $\Delta x_0$, $\Delta x_1$, $\Delta x_2$, $\Delta x_3$, respectively. Hence, the targeting beans coming from the transmit/receive module 200 that are shown in circular or cross-section views in FIG. 3 for clarity have their x-direction beam sizes adjusted to match their given axial distance location lateral x-direction target sizes. In this way, one is not using the smallest beam to sample the target transverse dimension with a given axial distance, which leads to massive data accumulation and increased scanning times. Instead, it is more effective to sample the target with the largest beam spot that matches its lateral size. Thus, volumetric data compression is realized leading to minimal beam scanning of a target to achieve the desired full 3-D object scan.

Figure 4:
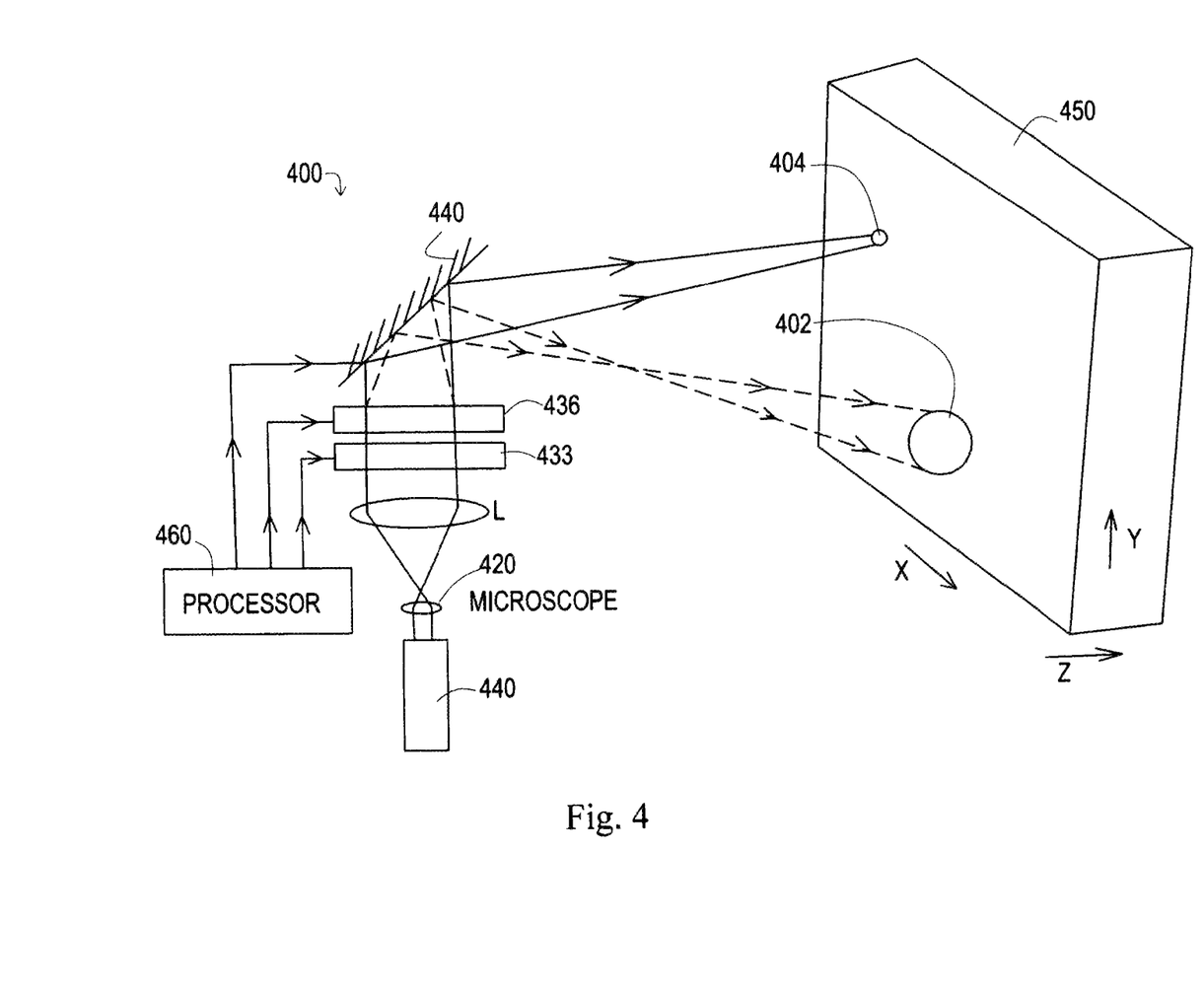
FIG. 4 is a schematic block diagram showing an embodiment of the smart spatial sampling/sensing application using mirror scanning of spot beams.

FIG. 4 shows the smart spatial sampling/sensing application according to an embodiment of the present invention using mirror scanning configuration 400 of different size spot beams, such as used to laser machine of a specific 3-D industrial part from a laser sensitive material substrate/block. This configuration includes a laser 410 that can be tunable or can be multiple laser, the laser power and pulse time, frequency, wavelength repetition are controlled by a processing device. The laser bean passes through a cascaded microscope lens 420, digital lens 433 and analog lens 436 before being reflected by a mirror 440. The mirror position is controlled by the processing device 460 for x and y-scanning. As in the previous examples, the focus of the digital lens 433 and analog lens 436 are controlled by the processing device 460.

In effect, based on the 3-D structure of the part to be fabricated from the material substrate 450, the appropriate beam spot sizes for the given x, y and z target locations is generated, thus minimizing number of scan beams. FIG. 4 shows a big spot 402 and small spot 404 representing an x-y image plane at a give z of the target 450 being scanned. The sensor can be programmed for part specific 3-D machining application, the part production time can be greatly reduced. In this example, the beam size on the image plane matches the desired machined part dimensions. The same smart spatial beam sampling principle applies to 3-D part inspection or 3-D objection reconstruction for visualization/animation applications.

One can also consider the sampling approach as a lower power consumption 3-D scanning approach for known 3-D targets as less computation power and optical power usage can be deployed to get the 3-D scan result.

An extension to laser machining application is laser surgery where again this 3-D smart scan sensor can be deployed.

Dentistry is another field than can benefit from this 3-D smart scan sensor where 3-D dental maps are needed for teeth replacement procedures or restorative dental work.

Additional applications for the proposed sensor includes semiconductor chip processing and assembly, laser scanning for printing and copying applications (textile industry), optical imaging/microscopy of volumetric objects, and pyrometry (radiation thermometry) using adjustable size hot spot capture imaging systems.

Figure 5A:
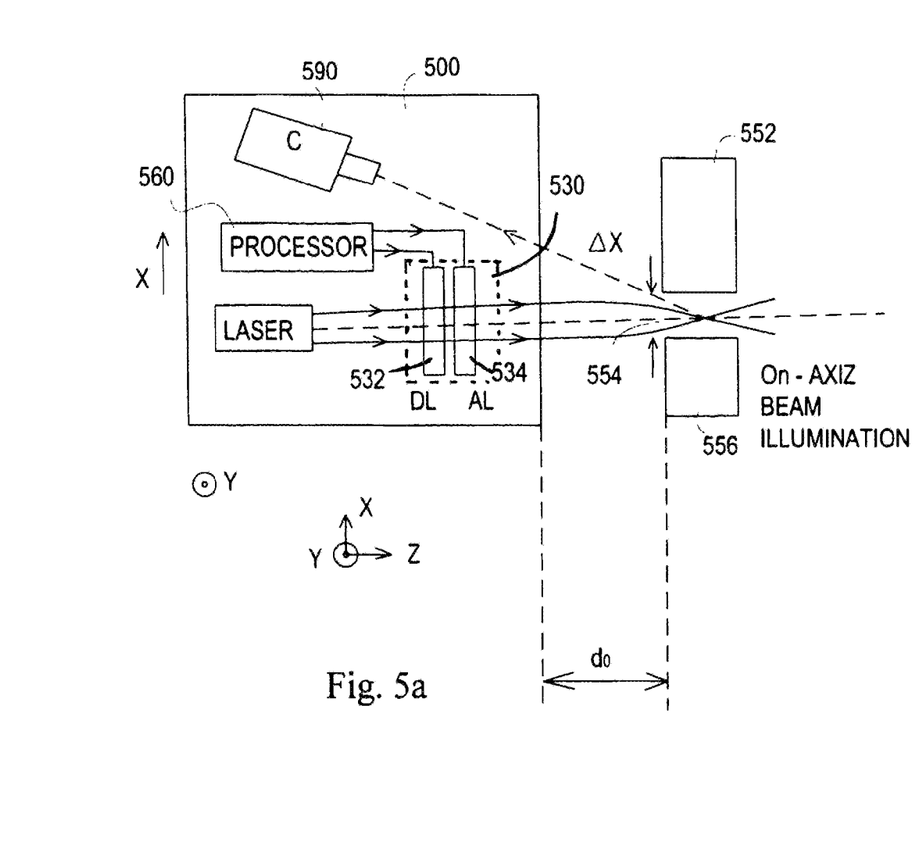
FIG. 5a is a schematic block diagram showing an embodiment of the smart spatial sampling/sensing application using the variable spot beam to measure gap between two in-plane targets at a given axial position.

FIG. 5a shows another configuration of the smart spatial sampling/sensing application using the variable spot beam to measure gap between two in-plane targets at a given axial position. For example, one in-plane target is the housing 556 of a gas turbine and the other in-plane target is the moving part turbine blade 552. The sensor goal is to monitor and measure the air gap 554 between the blade 552 and housing 556 shown in FIG. 5 as $\Delta x$ located at the axial distance $d_0$. The hybrid lens 530, including analog lens 534 and digital lens 532, in the T/R module 500 is adjusted so the beam spot size just covers the air gap with the beam positioned symmetrically and on-axis in the system. As in the previous example, the hybrid lens 530, including analog lens 534 and digital lens 532, the focus of the lenses are controlled by the processing device 590. The camera 560 observes the scattered light from the gap 554 to tell if the spot beam boundary falls on the gap edge. As the electronically controlled digital and analog lenses 532, 534 focal lengths are known, the spot beam size is calculated and this give the size of the air gap 554.

Figure 5B:
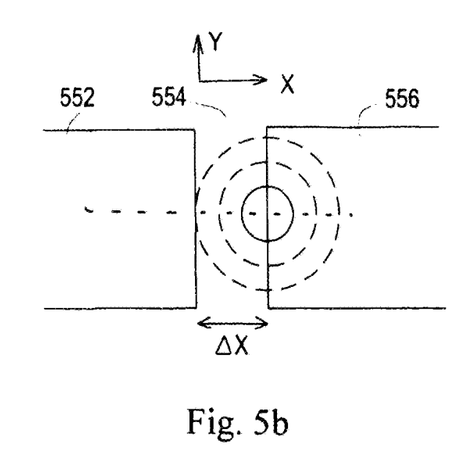
FIG. 5b shows a x-y view of the gap, but this time using a translated varying size spot beam whose edge/boundary/circumference edge touches the air gap edge.

FIG. 5b shows a x-y view of the gap 554 between the moving part 552 and stationary housing 556, but this time using a translated varying size spot beam whose edge/boundary/circumference edge touches the air gap edge. Based on the hybrid lens 530 setting so the beam edge touches the moving air gap edge, one can measure and monitor the size of the air gap. Edge-detection spot beam image processing can be used to accurately track gap size or part lateral displacement. The air gap zone is shown at a given axial distance of a 3-D part that may have other gap positions within its 3-D structure; hence the proposed smart sensor is required for gap size monitoring in the entire part. The point to note is that the boundary motion of the optical beam spot or the beam center motion can be used to measure object lateral (transverse, i.e., x and y-directions) displacements using the proposed smart sampling sensor.

A variety of lasers can be used in the proposed sensor, including wavelength ranges from the visible to the near infrared, e.g., 405 nm to 10.6 microns. In principle, the same concepts can be applied to all electromagnetic waves include radar band and Tera-Hertz radiation. In this case, the analog lens and digital lens can be formed by a variety of technologies, including phased array antennas to form 3-D beam focusing of the EM waves. Ultrasound can also be deployed to implement the proposed optical distance sensor concept, in this case, the analog lens and digital lens formed by ultrasound phased array transducer device. For the proposed smart sampling optical sensor, a variety of analog lens technologies can also be used such as electrically and optically controlled liquid crystal lenses, electrically and mechanically controlled liquid lenses, and micro-machined or MEMS-based electrically actuated variable focus optical lenses.

A typical design of a liquid lens is based on the electro-wetting process using two different liquids encased in a cavity. Change in voltage causes the boundary of the two liquids to behave as a lens-like curvature. The aperture and speed as well as other optical performance properties of the agile variable focus lenses deployed as analog lens and digital lens will depend on the specific application.

The previously described distance sensor optics using laser scan optics can form a smart laser writing system for 2-D surfaces such as when laser machining 3-D objects or when laser scanning 3-D objects for 3-D object reconstruction. In this embodiment, the same concept is extended to realize a smart 2-D display that simultaneously engages both the distance sensor capability and the smart high resolution beam 2-D scanning capability of the smart scanning distance sensor optics.

Hence, this embodiment of the present invention introduces the design of this new smart display application using the previously described scanning distance sensor. Specifically, a full color display is presented that uses red, green, and blue lasers in combination with one 2-D scan mirror optics and one 3-D beamformer optic like a programmable analog-digital variable focus lens system. In the very basic design case, the 3-D beamformer optic is a fluidic or liquid lens such as from Varioptic, France.

First the system acts as a distance sensor using one laser beam observed on the screen using viewing optics such as a camera or human eye viewing (depends on screen distance from laser). Once the distance of screen from laser is computed, the programmable lens focal length is now optimized such that the smallest spot beam for all three primary colors (red, green, blue) is seen on the display screen. During display calibration process for different screen distances, the programmable lens focal lengths and mirror scan angles are recorded for generating the required P x Q pixels display. In addition, larger size and pixel count displays will now be possible given for any distance, the spatial spot size will be the smallest given a screen distance.

Note that one can also program the electronic lens to produce a larger spot size than normally possible by using the diverging lens aspect of the 3-D beamforming optic. One may do so if a very large display size is needed for a given distance that otherwise would not be possible using beam's natural diffraction and would require many more pixels to fill the display.

The present invention provides 2-D displays, can be extended to one-dimensional (1-D) and Three Dimensional. (3-D) displays. Specifically, the field of invention is laser scanning displays where a laser beam (or three in-line laser beams, one for red, one for green, and one for blue color) are scanned in 2-D space by scanning optics (e.g., mirrors) so the human eye on temporal integration in-directly sees a 2-D image on the projection screen or directly on the human retina. Each laser is independently temporally modulated in order to produce color and gray-scale in the pixelated display.

Figure 6:
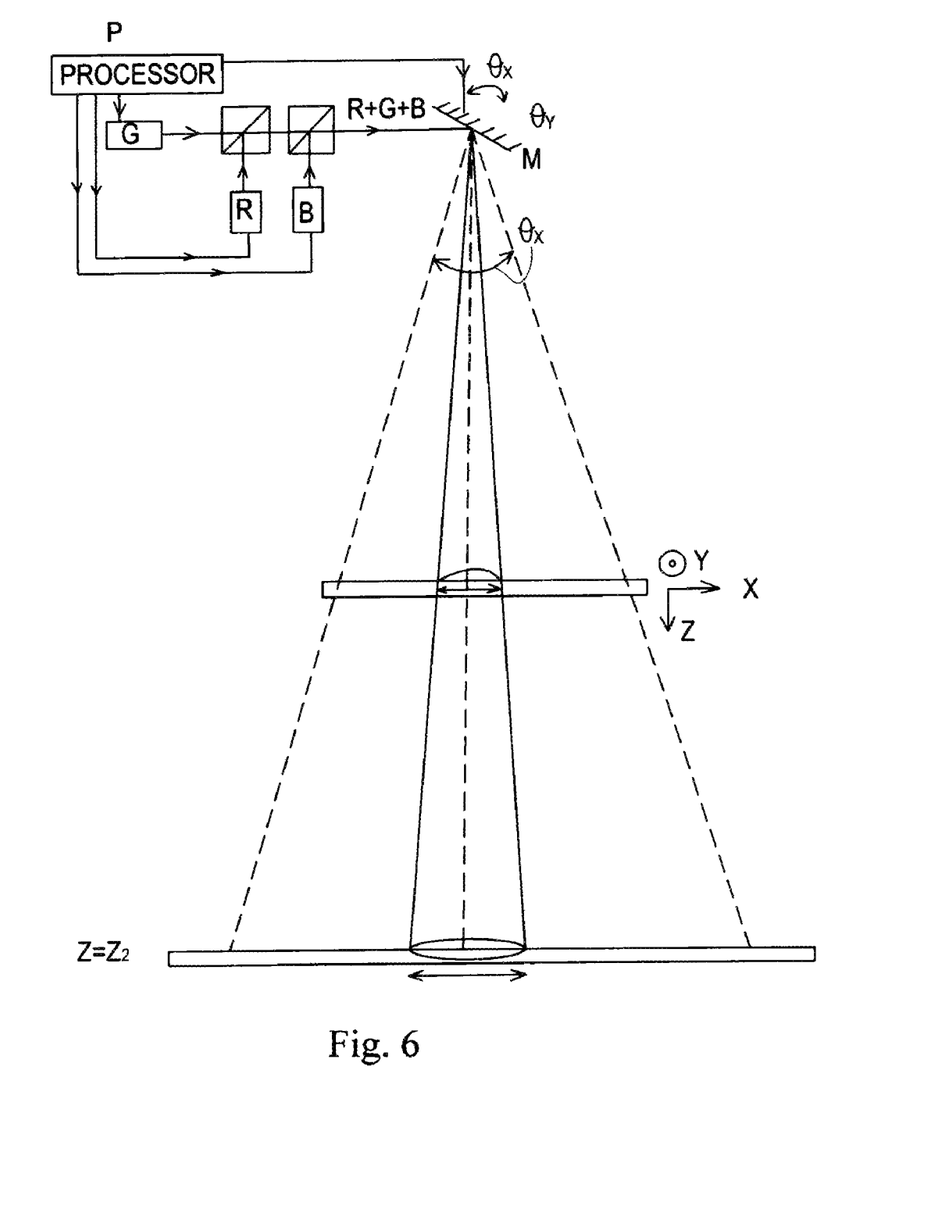
FIG. 6 shows an example of the prior art standard laser scanning 2-D display design.
Figure 7:
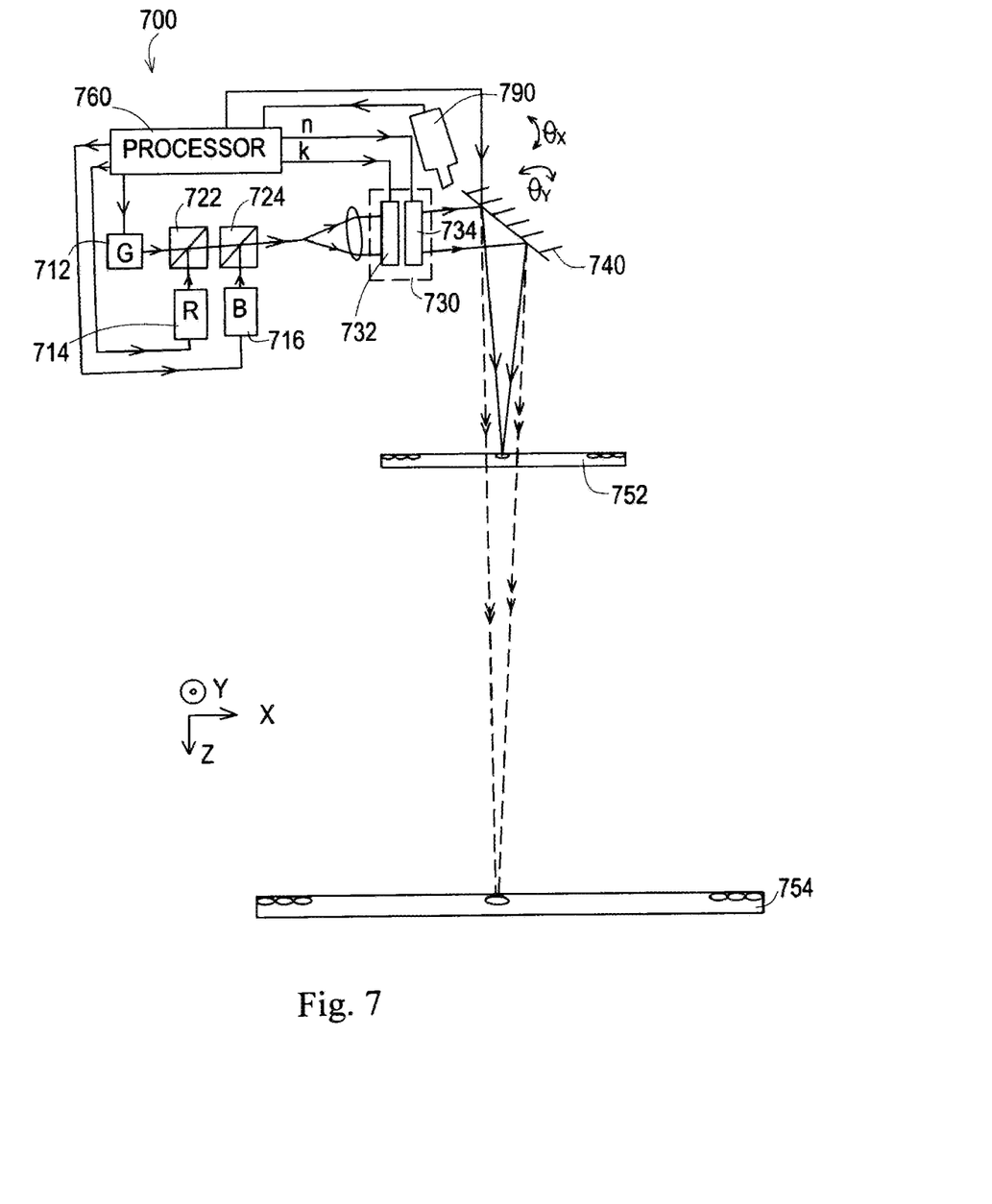
FIG. 7 is a schematic diagram showing the preferred embodiment of the laser scanning 2-D display design using one 3-D beamforming optic.

FIG. 6 shows the prior art standard laser scanning 2-D display design where the laser beam spot size increases for increasing distance of screen from laser optics. FIG. 7 is a top view the preferred embodiment of the laser scanning 2-D display design 700 using one 3-D beamforming optic, e.g., one programmable Hybrid Lens 730 that forms an analog-digital variable focus lens. The collimated laser beams from the red 714, green 712, and blue 716 lasers are combined using wavelength beam combining optics 722 and 724 and then pass through the electrically programmable hybrid lens 730 and a 2-D scanning mirror 740 directed towards a display screen target 752 and 754 subjected to a distance measurement. Two independent scan mirrors for x and y scans can also be used instead of a single x-y scan mirror 740 shown.

Distance is measured from the screen target 752 at or near normal incidence to the beam transmission exit position at the mirror-optic 740. The hybrid lens 730 is made up of a variable focal length Digital Lens 732 and a cascaded variable focal length Analog Lens 734 to form a high dynamic range and high resolution variable focal length targeting optical system 700. The digital lens 732 is controlled by a control signal from the processor. 760 labeled as k that varies from k=1, 2, 3, to K, producing K different focal length positions for the laser beam engaging the target. The focal length resolution of the variable digital lens 732 is designed to be equal to the analog lens 734 variable focus range of "l" from the processor 760 where $l=n\Delta 1$ with n=1, 2, 3, ..., N. Thus the analog lens 734 has N different focus positions. In total the hybrid lens 730 produces K times N variable focal length positions implying K×N independent distance positions that can be measured by the smart display working as a distance sensor. In effect, both a high dynamic range and high resolution distance measurement is possible as the digital lens 732 gives the distance measurement dynamic range while the analog lens 734 gives the distance measurement fine resolution as with the previously described embodiments.

The hybrid lens focal length is adjusted such as by processor controlled electronic signals so that the laser beam forms a minimum beam waist or focused beam spot on the target/screen 752 and 754 located at an unknown distance. One knows when the target/screen is illuminated by a focused beam by monitoring the laser beam spot on the display screen observed by a camera 790. A high resolution camera 790 and electronic image processing techniques implemented by the computer processor 760 are used estimate the beam spot size to determine when the size is a minimum at the screen.

As the hybrid lens focal length is changed, the spot swings from a larger spot to a smaller spot to a larger spot. The goal of the distance sensor within the smart display is to find the digital lens 732 and analog lens 734 drive conditions k and n when the spot on the optical camera forms a minimum size. In other words, when the screen is illuminated with a focused beam spot on the screen surface, one views the tightest (i.e., smallest) spot on the optical camera. As the HL focal length is calibrated for focus distance, this hybrid lens 730 focal length gives the screen distance $z=z_1$ (for Beam 1) or $z=z_2$ (for Beam 2) as shown in FIG. 2.

This screen distance measurement process can be conducted with one laser in its non-time modulating or starring mode or all three lasers 712, 714 and 716 in their starring modes. Once the display screen distance is known, the processor 760 can compute the needed x-y mirror scan angles to generate the required P x Q pixels image on the display screen at this given distance by angularly scanning Beam 1 (for screen at $z=z_1$) and Beam 2 (for screen at $z=z_2$). Thus a smart display is realized at the given screen distance with the highest spatial resolution (or smallest pixel size) for the display.

Because the beam spot sizes for a given screen distance zone, e.g., between $z=z_1$ and $z=z_2$, can electronically controlled, smart displays can be formed for screens positioned any at or between $z=z_1$ and $z=z_2$. Furthermore, if a larger display size at a given screen distance is required, one only requires an increase in the scan angle values without enlarging the pixel size, thus getting both a larger display size and high resolution (i.e., smallest pixel size possible) display. Such a display was not possible with prior art. Do note that one can also using direct eye viewing of the laser beam spot to determine smallest spot size on screen and hence screen distance, particularly in cases when screen distances are large, i.e., when spot sizes are humanly resolvable.

Figure 8:
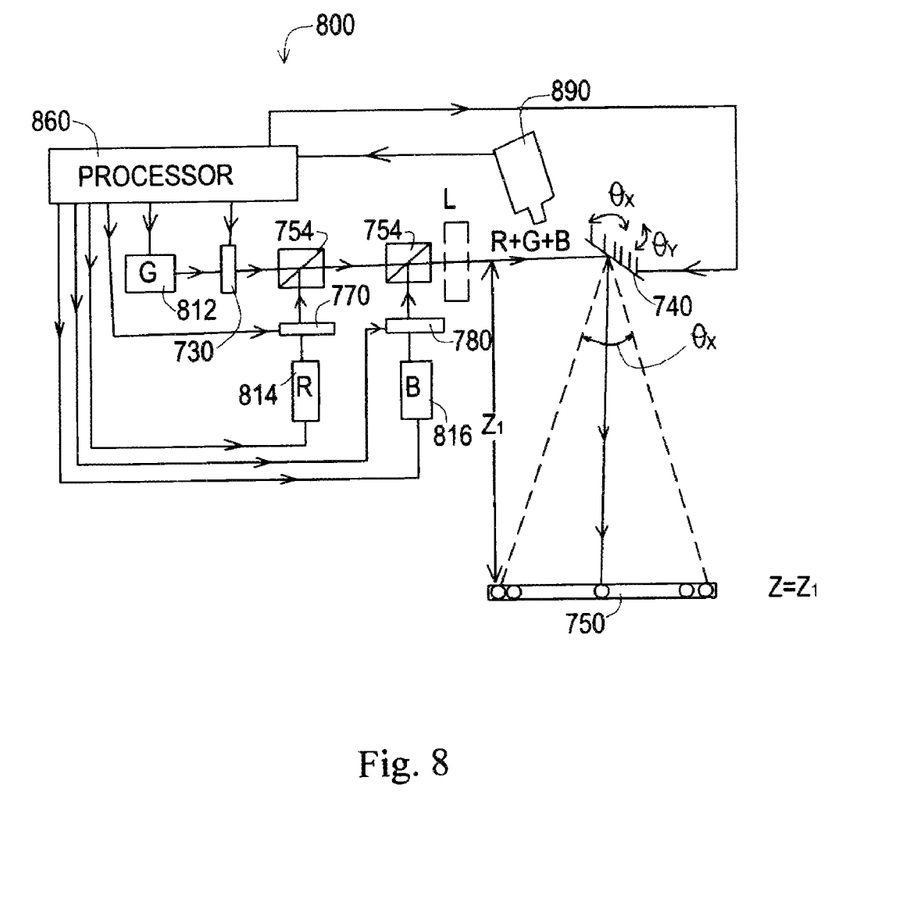
FIG. 8 is a block diagram showing an alternative embodiment of the laser scanning 2-D display design using three independent 3-D beamforming optics for the three different color lasers.

FIG. 8 shows an alternate embodiment of the invention, namely, a laser scanning 2-D display 800 design using three independent 3-D beamforming optics, e.g., 3 liquid hybrid lenses 730, 770 and 780, for the 3 different lasers 812, 814 and 816, respectively. As in the previous embodiments, each hybrid lens includes a digital lens and cascaded analog lens controlled by signals from the processor 860. This method can be useful if the programmable lenses 730, 770 and 780 have higher chromatic or color sensitive effects than desired that can lead of different beam sizes at the screen for the red, green, and blue colors for the same drive conditions for the hybrid lens. Hence, for optimal smart display performance, one can use separate HL lenses for the different color laser beams.

In FIG. 8, programmable lenses hybrid lenses 730, 770 and 780, are used for laser colors Green, Red, and Blue, respectively. Note that each hybrid lens is controlled by its independent electronic control signal from the processor 860. An optional beamforming fixed optic L (can be a cascade of fixed focal length diverging/converging lenses) can be used to condition the laser beams for optimal screen distance ranges, e.g., 0.25 meters to 5 meters. The operation of the smart display shown in FIG. 8 is similar to the FIG. 7 smart display system, except drive conditions for the hybrid lenses for a given screen distance are different.

For the smart displays of the present invention shown in FIG. 7 and FIG. 8, a variety of analog lens technologies can be used such as electrically and optically controlled liquid crystal lenses, electrically and mechanically controlled liquid lenses, and micro-machined or MEMS-based electrically actuated variable focus optical lenses. A typical design of a liquid lens is based on the electro-wetting process using two different liquids encased in a cavity. Change in voltage causes the boundary of the two liquids to behave as a lens-like curvature. Electrically controlled variable focal length lenses have been proposed for a variety of applications such as free-space communications, confocal microscopy, optical chip device inspection and height profiling.

In summary, a first embodiment provides a smart spatial optical sampling/sensing device that includes a laser source for producing an input laser beam, a variable focal length telescopic targeting system to project the input laser beam toward a target subjected to a measurement, a detection device for detecting the return beam from the target and generating a signal in response, and a processing device to control the laser source and variable focal length telescopic targeting system and receive the signal from the detection device, wherein the optical distance sensor adjusts the transverse beam spot size at each axial position based on the specific target's 3-D shape profile for an optimized smaller sampling data set is generated for a given target.

The variable focal length optical device includes a beam splitter, and a first variable hybrid lens to produces a F1 effective focal length cascaded with a second variable hybrid lens to produces a F1 effective focal length serially aligned with the beam splitter to project the input laser beam toward a target and receiving a return beam from the target. The first and second hybrid lenses can be a variable focal length digital lens and cascaded variable focal length analog lens to form the variable focal length telescopic targeting optical system, the digital lenses give the transverse distance measurement dynamic range while the analog lenses give the transverse distance measurement fine resolution. The detection device can be an on-axis photo-detector optics to detect a reflected input laser beam and target reflected beam from the beam splitter and producing a signal in response to the detected reflected beams that can be an optical lens and a photodetector.

Alternatively, the variable focal length optical device can be a variable hybrid lens to direct the input laser beam toward a diffused or optically scattering target subjected to the measurement and the hybrid lenses can be a variable focal length digital lens and cascaded variable focal length analog lens to form the variable focal length telescopic targeting optical system, the focal length of the variable digital lens and cascaded variable focal length analog lens varied to control the laser beam spot size focused on the target. In this embodiment, the detection device can be an off-axis optical camera and the variable focal length telescopic targeting system can be a variable 3-dimensional beam former optic device for receiving the laser beam and an adjustable scan mirror optics.

A second preferred embodiment provides a smart spatial optical scanning device that includes a laser source for producing an input laser beam, an input optics and cascaded variable hybrid optical lens cascaded with the laser source, a controllable mirror to reflected the laser beam from the variable hybrid lens toward the target, and a processing device to control the laser source and the variable hybrid optical lens to control a beam size directed toward the target and to control a position of the controllable mirror to scan different size spot beams from the variable hybrid optical lens.

A third embodiment provides a laser scanning display system that includes a controllable laser source to produce a laser beam, a wavelength beam forming optics for receiving the laser beam and producing a scanning beam, a programmable hybrid lens to focus the scanning beam, an adjustable scanning mirror for reflecting the focused scanning beam toward the display screen, a processing device having a memory to control the laser source, to control the wavelength beam forming optics, to focus the scanning beam spot in the display screen, to adjust a position of the adjustable scanning mirror to scan the display screen and to record the programmable hybrid lens focal length and mirror scan angles in the memory to generate plural pixels on the display screen, and a display screen to display an image produced by scanning the display screen with the reflected focused scanning beam. The controllable laser source can be a first, second and third laser source each producing a different color laser beam for displaying a color image on the display screen and the wavelength beam forming optics can include at least two beam combining devices for combining the different color laser source beams to form the three in-line laser beams. The scanning system can include a camera to view the laser beam spatial spot size on the display screen for determining a distance of the display screen from the laser source to calibrate the display scanning system; the variable 3-dimensional beam former optic device can be a one of a fluid lens or a liquid lens; the variable 3-dimensional beam former optic device can be a variable digital lens cascaded with a variable analog lens, the processing device controlling the focal length of the variable digital lens and variable analog lens; and the adjustable scanning mirror can be an adjustable x-scanning mirror and an adjustable y-scanning mirror.

The programmable hybrid lens can be a variable digital lens cascaded with a variable analog lens to form a high dynamic range and high resolution variable focal length targeting optical system and the wavelength beam forming optics and programmable hybrid lens can include a first programmable hybrid lens aligned with the first laser to focus the first color laser beam, a second programmable hybrid lens aligned with the second laser to focus the second color laser beam, a first beam forming optics for combining the first focused color laser beam with the second focused color laser beam to produce a first in-line color laser beam, a third programmable hybrid lens aligned with the third laser to focus the third color laser beam, and a second beam forming optics for combining the first in-line color laser beam with the third focused color laser beam to form a combined color in-line laser beam.

Yet another embodiment provides a method for laser scanning on a display screen that includes the steps of providing a laser beam by a laser source for scanning the display screen, passing the laser beam through a variable 3-dimensional beam former optic device, directing the formed, laser beam toward the display screen by adjusting a variable lens focal length and an adjustable mirror position, aligning the display scanning system with the display screen, computing a distance between the laser source and the display screen to optimize the beam spot size on the display screen for the computed distance, recording the variable lens focal length and the mirror scan angle data to generate plural pixels on the display screen, and scanning the display screen using the recorded variable lens focal length and the mirror scan angle data to display the image on the display screen. In this embodiment, the aligning step can include the step of detecting the beam spot on the display screen by a viewing optics, adjusting the focal length of the variable lens to adjust the laser beam spatial spot size on the display screen, and adjusting the mirror scan angle to change the position of the laser beam on the display screen to generate plural pixels on the display screen and can further include the steps of adjusting a focal length of the variable lens to vary the laser beam spot size, and adjusting a position of a mirror for reflecting the focused laser beam toward the display screen.

While the invention has been described, disclosed, illustrated and shown in various terms of certain embodiments or modifications which it has presumed in practice, the scope of the invention is not intended to be, nor should it be deemed to be, limited thereby and such other modifications or embodiments: as may be suggested by the teachings herein are particularly reserved especially as they fall within the breadth and scope of the claims here appended.

We claim:

1. A smart spatial optical sampling/sensing device comprising:
    a laser source for producing an input laser beam;
    a variable focal length telescopic targeting system to project the input laser beam toward a target subjected to a measurement;
    a detection device for detecting the return beam from the target and generating a signal in response, wherein the detection device comprises an optical photo detector and an optical distance sensor; and
    a processing device to control the laser source and variable focal length telescopic targeting system and receive the signal from the detection device,
    wherein the optical distance sensor adjusts the transverse beam spot size at each axial position based on the specific target's 3-D shape profile for an optimized smaller sampling data set is generated for a given target.

2. The sensor of claim 1 wherein the variable focal length telescopic targeting system comprises:
    a beam splitter; and
    a first variable hybrid lens to produces a F1 effective focal length cascaded with a second variable hybrid lens to produces a F1 effective focal length serially aligned with the beam splitter to project the input laser beam toward a target and receiving a return beam from the target.

3. The sensor of claim 2 wherein each of the first and second hybrid lenses comprise:
    a variable focal length digital lens and cascaded variable focal length analog lens to form the variable focal length telescopic targeting optical system, the digital lenses give the transverse distance measurement dynamic range while the analog lenses give the transverse distance measurement fine resolution.

4. The sensor of claim 1 wherein the detection device comprises:
an on-axis photo-detector optics to detect a reflected input laser beam and target reflected beam from the beam splitter and producing a signal in response to the detected reflected beams.

5. The sensor of claim 4 wherein the on-axis photo-detector optics comprises:
an optical lens; and
a photodetector.

6. The sensor of claim 1 wherein the variable focal length telescopic targeting system comprises:
a variable hybrid lens to direct the input laser beam toward a diffused or optically scattering target subjected to the measurement.

7. The sensor of claim 6 wherein the hybrid lenses comprises:
a variable focal length digital lens and cascaded variable focal length analog lens to form the variable focal length telescopic targeting optical system, the focal length of the variable digital lens and cascaded variable focal length analog lens varied to control the laser beam spot size focused on the target.

8. The sensor of claim 1 wherein the detection device comprises:
an off-axis optical camera.

9. The sensor of claim 8 wherein the variable focal length telescopic targeting system comprising:
a variable 3-dimensional beam former optic device for receiving the laser beam; and
an adjustable scan mirror optics.

10. A smart spatial optical scanning device comprising:
a laser source for producing an input laser beam;
an input optics and cascaded variable hybrid optical lens cascaded with the laser source, the variable hybrid optical lens comprising a variable digital lens cascaded with a variable analog lens to form a high dynamic range and high resolution variable focal length targeting optical system;
a controllable mirror to reflected the laser beam from the variable hybrid lens toward a target; and
a processing device to control the laser source and the variable hybrid optical lens to control a beam size directed toward the target and to control a position of the controllable mirror to scan different size spot beams from the variable hybrid optical lens.

11. A laser scanning display system comprising:
a controllable laser source to produce a laser beam;
a wavelength beam forming optics for receiving the laser beam and producing a scanning beam;
a programmable hybrid lens to focus the scanning beam;
an adjustable scanning mirror for reflecting the focused scanning beam toward the display screen;
a processing device having a memory to control the laser source, to control the wavelength beam forming optics, to focus the scanning beam spot in the display screen, to adjust a position of the adjustable scanning mirror to scan the display screen and to record the programmable hybrid lens focal length and mirror scan angles in the memory to generate plural pixels on the display screen; and
a display screen to display an image produced by scanning the display screen with the reflected focused scanning beam.

12. The display of claim 11 wherein the controllable laser source comprises:
a first, second and third laser source each producing a different color laser beam for displaying a color image on the display screen.

13. The display of claim 12 wherein the wavelength beam forming optics comprises:
at least two beam combining devices for combining the different color laser source beams to form the three in-line laser beams.

14. The system of claim 12 wherein the wavelength beam forming optics and programmable hybrid lens comprises:
a first programmable hybrid lens aligned with the first laser to focus the first color laser beam;
a second programmable hybrid lens aligned with the second laser to focus the second color laser beam;
a first beam forming optics for combining the first focused color laser beam with the second focused color laser beam to produce a first in-line color laser beam;
a third programmable hybrid lens aligned with the third laser to focus the third color laser beam; and
a second beam forming optics for combining the first in-line color laser beam with the third focused color laser beam to form a combined color in-line laser beam.

15. The display of claim 11 further comprising:
a camera to view the laser beam spatial spot size on the display screen for determining a distance of the display screen from the laser source to calibrate the display scanning system.

16. The display of claim 11 wherein the variable 3-dimensional beam former optic device comprises:
one of a fluid lens or a liquid lens.

17. The display of claim 11 wherein the variable 3-dimensional beam former optic device comprises:
a variable digital lens cascaded with a variable analog lens, the processing device controlling the focal length of the variable digital lens and variable analog lens.

18. The system of claim 11 wherein the adjustable scanning mirror comprises:
an adjustable x-scanning mirror and an adjustable y-scanning mirror.

19. The system of claim 11 wherein the programmable hybrid lens comprises:
a variable digital lens cascaded with a variable analog lens to form a high dynamic range and high resolution variable focal length targeting optical system.

20. A method for laser scanning on a display screen comprising the steps of:
providing a laser beam by a laser source for scanning the display screen;
passing the laser beam through a variable 3-dimensional beam former optic device;
directing the formed laser beam toward the display screen by adjusting a variable lens focal length and an adjustable mirror position;
aligning the display scanning system with the display screen;
computing a distance between the laser source and the display screen to optimize the beam spot size on the display screen for the computed distance;
recording the variable lens focal length and the mirror scan angle data to generate plural pixels on the display screen; and
scanning the display screen using the recorded variable lens focal length and the mirror scan angle data to display the image on the display screen.

21. The method of claim 20 wherein the aligning step comprises the step of:
- detecting the beam spot on the display screen by a viewing optics;
- adjusting the focal length of the variable lens to adjust the laser beam spatial spot size on the display screen; and
- adjusting the mirror scan angle to change the position of the laser beam on the display screen to generate plural pixels on the display screen.

22. The method of claim 21 further comprising the step of:
- adjusting a focal length of the variable lens to vary the laser beam spot size; and
- adjusting a position of a mirror for reflecting the focused laser beam toward the display screen.

* * * * *